United States Patent
Dontula

(10) Patent No.: US 12,005,681 B2
(45) Date of Patent: Jun. 11, 2024

(54) SOLID OXYGEN ABSORBING FILM

(71) Applicant: Multisorb Technologies, Inc., Buffalo, NY (US)

(72) Inventor: Narasimharao Dontula, Rochester, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 344 days.

(21) Appl. No.: 15/363,882

(22) Filed: Nov. 29, 2016

(65) Prior Publication Data
US 2017/0080691 A1    Mar. 23, 2017

Related U.S. Application Data

(63) Continuation-in-part of application No. PCT/US2015/036052, filed on Jun. 16, 2015.

(51) Int. Cl.
| B32B 27/08 | (2006.01) |
| C08L 101/00 | (2006.01) |
| C08K 3/08 | (2006.01) |
| C08K 3/16 | (2006.01) |

(52) U.S. Cl.
CPC ............ B32B 27/08 (2013.01); C08L 101/00 (2013.01); *B32B 2307/724* (2013.01); *C08K 3/08* (2013.01); *C08K 3/16* (2013.01)

(58) Field of Classification Search
CPC . B01J 20/0229; B01J 20/06; B32B 2307/724; B32B 27/08; B32B 27/285; B32B 27/32; B32B 27/34; B65D 81/266; C08J 2371/00; C08J 5/18; C08K 3/00; C08L 101/00
See application file for complete search history.

(56) References Cited

U.S. PATENT DOCUMENTS

| 5,869,414 A | 2/1999 | Fischer et al. |
| 2003/0003308 A1 | 1/2003 | Kashiba et al. |
| 2003/0100656 A1* | 5/2003 | Majumdar .............. C01B 33/44 524/445 |
| 2004/0029467 A1* | 2/2004 | Lacroix ................... B32B 27/12 442/76 |
| 2007/0020456 A1* | 1/2007 | Solovyov ................. B01J 20/02 428/403 |

(Continued)

FOREIGN PATENT DOCUMENTS

| JP | 2003113311 A | 4/2003 |
| WO | 02100639 A1 | 12/2002 |

(Continued)

OTHER PUBLICATIONS

Lotryl 28MA07 NPL document, retrieved Apr. 5, 2019.*
Lotryl 20MA08 NPL document, retrieved Apr. 5, 2019.*
Melt Index Mysteries NPL document, retrieved Apr. 5, 2019.*
PEBAX grades NPL document, retrieved Apr. 5, 2019.*

(Continued)

*Primary Examiner* — Michael B Nelson
(74) *Attorney, Agent, or Firm* — Simpson & Simpson, PLLC

(57) ABSTRACT

A multilayer nonporous oxygen absorbing structure that resists delamination, e.g., humidity induced delamination, including a first layer having a first continuous polymer phase, a first water insoluble, dispersed, polyether resin phase in the first continuous polymer phase, and a water activated oxygen absorber, and a second layer having a second continuous polymer phase, bonded to the first layer.

17 Claims, 5 Drawing Sheets

(56) References Cited

U.S. PATENT DOCUMENTS

| | | | |
|---|---|---|---|
| 2007/0248834 A1 | 10/2007 | Ishihara et al. | |
| 2008/0214699 A1* | 9/2008 | Halahmi | B29B 7/005 523/222 |
| 2010/0051861 A1 | 3/2010 | Inubushi et al. | |
| 2011/0195148 A1* | 8/2011 | Mentink | C08G 18/6484 426/3 |
| 2014/0291178 A1* | 10/2014 | Masuda | C08J 5/18 206/205 |
| 2015/0147551 A1* | 5/2015 | Brule | B32B 27/12 428/220 |

FOREIGN PATENT DOCUMENTS

| | | |
|---|---|---|
| WO | 2006/133847 | 12/2006 |
| WO | WO 2014/001675 * | 1/2014 |
| WO | 2016/204733 | 12/2016 |

OTHER PUBLICATIONS

PEBAX SA01 NPL document, retrieved Apr. 5, 2019.*
PEBAX SP01 NPL document, retrieved Apr. 5, 2019.*
PEBAXSA01 MED NPL document, retrieved Apr. 5, 2019.*
http://onlinelibrary.wiley.com/doi/10.1002/0471238961.15242507191512115.a01.pub2/abstract Solovyov, S. E. 2014. Oxygen Scavengers. Kirk-Othmer Encyclopedia of Chemical Technology. 1-31.
Work, W.J.; Horie, K.; Hess, M.; and Stepto, R.F.T.; Pure Appl. Chem., vol. 76, No. 11, pp. 1985-2007, © 2004 IUPAC; Definitions of Terms Related to Polymer Blends, Composites, and Multiphase Polymeric Materials.
http://rsta.royalsocietypublishing.org/ Léger, Liliane; and Creton, Constantino; Phil. Trans. R. Soc. A. (2008) 366, pp. 1425-1442; published online Dec. 20, 2007; Adhesion Mechanisms at Soft Polymer Interfaces.

* cited by examiner

SOLID OXYGEN ABSORBING FILM

CROSS-REFERENCE TO RELATED APPLICATIONS

This application is a Continuation-in-Part of International Patent Application No. PCT/US2015/036052, filed on Jun. 16, 2015, which application is incorporated herein by reference in its entirety.

FIELD OF THE INVENTION

The invention broadly relates to oxygen absorbers for high humidity and/or low temperature applications, more specifically to a solid oxygen absorbing film, and even more particularly to solid oxygen absorbing film that is insoluble in water, highly moisture and oxygen permeable, resistant to delamination and capable of absorbing oxygen rapidly from a volume containing or enclosed by the absorber.

BACKGROUND OF THE INVENTION

Many applications require an active oxygen absorber. For example, many pharmaceutical tablets and food products degrade upon exposure to oxygen. Preventing, reducing or delaying contact with oxygen can prolong the useful life of such items. Hence, packaging materials and separate inserts with oxygen absorbing characteristics are included.

Some materials used to make packaging, without additional components included, form effective oxygen and moisture barriers. For example, polychlorotrifluoroethylene (PCTFE) provides substantial impermeability to water and oxygen. Foil and metalized films are also effective barriers. However, such materials are often difficult to recycle, are opaque, and may be expensive and therefore cost prohibitive in many applications. Moreover, any initial oxygen or water present within the packaging becomes trapped and remains reactive.

Films that provide moisture breathability are known in the art. For example, the use of polyether-block-polyamide with ethylene methyl acrylate copolymer is known to permit and/or maintain moisture breathability. (See, e.g., U.S. Pat. No. 5,869,414, the disclosure of which is incorporated herein by reference). Materials that do not act as oxygen or water vapor barriers may be used to package food products. Therefore, an oxygen absorber must capture any oxygen that passes from the outside to the inside of the container and remove oxygen in the headspace of the container or undesirable degradation of the food product could occur.

Most transition metal based oxygen absorbers, such as iron based absorbers require moisture in order to promote oxygen absorption at acceptable rates. However, extraction of such oxygen absorbers from the materials in which they are contained, e.g., films or other carriers, is undesirable as they may contaminate the material being protected from oxygen, e.g., a food product. Thus, moisture must be provided to the oxygen absorbers for activation while minimizing or preventing extraction of the absorbers from the material in which they are contained.

While oxygen is flushed from some packages during production, other production processes do not include a step of filling a packaging container with an inert gas such as nitrogen. In such processes a packaging container may be sealed with atmospheric gases, i.e., about 78% nitrogen and 21% oxygen inside. This oxygen can react with the material within the packaging if there is no means of absorbing the oxygen present within the packaging.

It is known to use an oxygen absorber in a sachet in these circumstances. The sachet typically contains an oxygen absorber with a large amount of exposed reactive surface area. Heretofore, film based oxygen absorbers have typically performed more slowly than sachet based absorbers and have been inadequate for use in applications where rapid uptake is necessary. For oxygen absorbers which are dependent on water activity, film based oxygen absorbers are limited by the rate of oxygen and water vapor diffusion as in both water vapor and oxygen must reach an oxygen absorbing material in order for scavenging or absorption to occur. Moreover, both oxygen and water vapor diffusion rates decrease with temperature, so applications under refrigeration make film based oxygen absorbers even more difficult to utilize.

In view of the foregoing it is apparent that there is a need for an oxygen absorbing film that is insoluble in water while maintaining water vapor and oxygen permeability levels sufficient to ensure extended shelf life for products incorporating the film in packaging. While films are a principle application for the improvements described in this application, other forms of plastic based absorbers will also benefit from their use.

BRIEF SUMMARY OF THE INVENTION

An embodiment of the present invention broadly comprises a nonporous oxygen absorbing composition including a water insoluble resin having polyether, and a water activated oxygen absorber. The composition has a water vapor permeability greater than or equal to 0.040 grams-millimeters per square meter per twenty four hours $$\left(\frac{g \cdot mm}{m^2 \cdot 24 \text{ hrs}}\right)$$

at 5° C. and 90% relative humidity.

An embodiment of the present invention includes an amount of water insoluble resin having polyether in a dispersed and discontinuous phase in a continuous second resin phase.

In a further embodiment, the present invention broadly comprises an oxygen absorbing film including a nonporous active layer including the nonporous oxygen absorbing composition described above. Moreover, in yet further embodiments, the present invention broadly comprises a food packaging insert, a lid stock, a tray and/or a container including the nonporous oxygen absorbing composition described above.

These and other objects and advantages of the present invention will be readily appreciated from the following description of preferred embodiments of the invention and from the accompanying drawings and claims.

BRIEF DESCRIPTION OF THE DRAWINGS

The nature and mode of operation of the present invention will now be more fully described in the following detailed description of presently preferred embodiments of the invention taken with the accompanying drawing figures, in which.

DETAILED DESCRIPTION OF THE INVENTION

Figure 1:
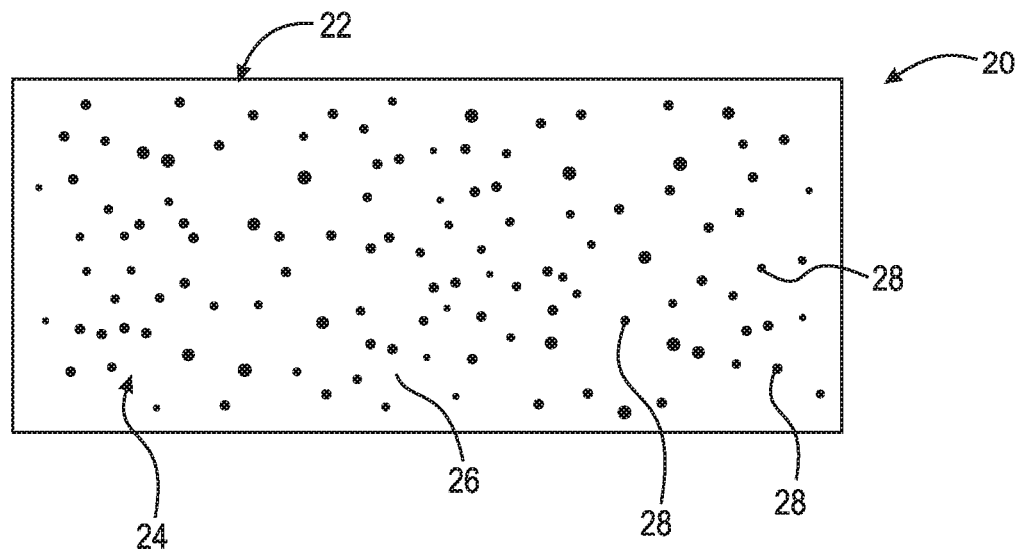
FIG. 1 is a cross-sectional view of an embodiment of an oxygen absorbing composition, i.e., an active layer.
Figure 2:
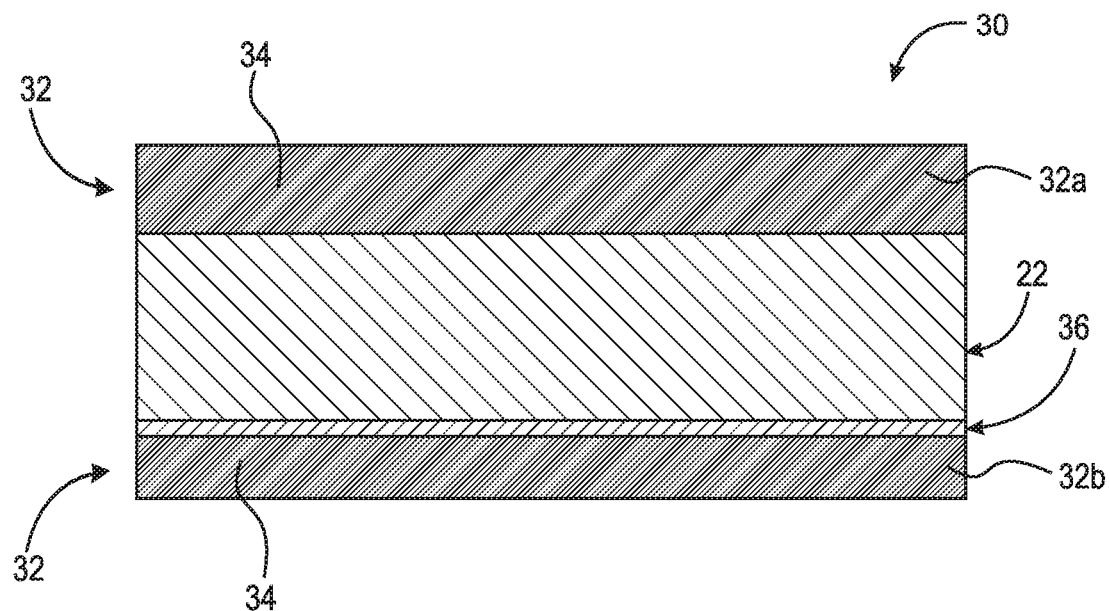
FIG. 2 is a cross-sectional view of another embodiment of an oxygen absorbing film, i.e., a structure comprising an active layer and two oppositely disposed skin layers.

At the outset, it should be appreciated that like drawing numbers on different drawing views identify identical, or functionally similar, structural elements of the invention. While the present invention is described with respect to what are presently considered to be the preferred aspects, it is to be understood that the invention as claimed is not limited to the disclosed aspects.

Furthermore, it is understood that this invention is not limited to the particular methodologies, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the meaning commonly understood by one of ordinary skill in the art to which this invention belongs. As used herein, "melt processable" is intended to mean a thermoplastic resin or composition that can be thermally processed one or more times and does not substantially degrade when heated and re-solidified under normal processing conditions for the composition, e.g., no substantial loss of molecular weight, no substantial oxidation of the resin, etc. "Polyether-block-polyamide" is intended to mean a block copolymer made of blocks of polyether and polyamide segments. Moreover, as used herein, "nanoclay" is intended to mean nanoparticles of layered mineral silicates.

"Water insoluble" is intended to mean a material that will not dissolve in water or an aqueous solution, and "nonporous" is intended to mean a material that permits passage of a component of interest through a solution diffusion mechanism typically described by Fick's Law, e.g., ordinary concentration diffusion of water vapor; however, the material does not have any available open pathway where material is not present, i.e., there are no distinct through holes or through channels. "Domain size control" is intended to mean the size distribution of a dispersed phase in a continuous phase something which is controlled by process, chemistry of components, and ratio of viscosities of one resin component to another resin component during a process like compounding. "Elastomers" are intended to include resins that have elastomeric characteristics at the temperature of use. Herein, a "polymer film" is intended to mean a thin, i.e., less than 10 mil (0.000254 m), continuous primarily polymeric material, while "polymer sheet" is meant to be a continuous primarily polymeric material greater than 10 mil (0.000254 m).

It should be understood that the use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Although any methods, devices or materials similar or equivalent to those described herein can be used in the practice or testing of the invention, the preferred methods, devices, and materials are now described.

The present disclosure includes a new oxygen absorbing composition, structures incorporating that composition and uses of the composition. In some embodiments, the structures comprise a multi-layer arrangement including the present oxygen absorbing composition therein.

Polyether containing polymers and Polyether Block Copolymers

Polyether segments are, for example, polyethylene glycol, polypropylene glycol or polytetramethylene glycol. The molecular mass Mn of these polyethers may be between 250 and 6,000. Polymers containing polyamide blocks and polyether blocks result from the copolycondensation of polyamide sequences containing reactive ends with polyether sequences containing reactive ends, such as, among others: 1) Polyamide sequences containing diamine chain ends with polyoxyalkylene sequences containing dicarboxylic chain ends; 2) Polyamide sequences containing dicarboxylic chain ends with polyoxyalkylene sequences containing diamine chain ends, obtained by cyanoethylation and hydrogenation of aliphatic alpha, omega dihydroxylated polyoxyalkylene sequences called polyetherdiols; and, 3) Polyamide sequences containing dicarboxylic chain ends with polyether diols, the products obtained being, in this particular case, polyetheresteramides, where the polyamide sequences containing dicarboxylic chain ends originate, for example, from the condensation of alpha, omega-aminocarboxylic acids of lactams or of dicarboxylic acids and diamines in the presence of a dicarboxylic acid chain limiter, the polyamide blocks are advantageously made of polyamide-12. The number molecular mass Mn of the polyamide sequences is between 300 and 15,000 and preferably between 600 and 5,000. The mass Mn of the polyether sequences is between 100 and 6,000 and preferably between 200 and 3,000.

The polymers containing polyamide blocks and polyether blocks may also include randomly distributed units. These polymers may be prepared by the simultaneous reaction of the polyether and of the precursors of the polyamide blocks. Whether the polyether blocks originate from polyethylene glycol, polyoxypropylene glycol or polyoxytetramethylene glycol, the blocks are either employed as is and copolycondensed with polyamide blocks containing carboxylic ends, or the blocks are aminated in order to be converted into polyetherdiamines and condensed with polyamide blocks containing carboxylic ends. The blocks can also be mixed with polyamide precursors and a chain limiter in order to make polymers containing polyamide blocks and polyether blocks which have statistically distributed units. The foregoing types of block copolymers are discussed in U.S. Pat. No. 4,331,786, the disclosure of which is incorporated herein by reference.

Water Vapor Permeability

The present oxygen absorbing composition must be permeable to water vapor or moisture, while also being nonporous. In short, water vapor must diffuse into and through the resin in order to activate the oxygen absorbing material incorporated therein; however, direct open pathways or pores are not appropriate for the present composition and uses thereof. It is known that water vapor permeability of resins decreases significantly with temperature, e.g., the water vapor permeability of a resin at 2° C.-6° C. is significantly less than the water vapor permeability of the same resin at 20° C. It should be noted that not only does water vapor permeability decrease as temperature of the resin decreases, but other characteristics also decrease, e.g., oxygen permeability. Thus, besides dispersion of oxygen absorbers in polymeric or resin components, diffusion limitations of resins at low temperatures present additional issues to be overcome by careful formulation of the present oxygen absorbing composition.

Water vapor permeability is typically represented by the units kilograms times unit thickness (meters) per second per square meter per Pascal $$\frac{kg \cdot m}{s \cdot m^2 \cdot Pa}.$$

In other words, water vapor permeability represents how fast, in $$\frac{kg}{s},$$

one square meter of vapor barrier or vapor diffusion retarder permits water vapor to pass through when there is one Pascal difference of partial pressure of water vapor on both sides of the barrier. It quantifies the property of a material which permits the passage of water vapor through it, i.e., the time rate of water vapor transmission through a unit area of material of unit thickness induced by a unit vapor pressure difference between two specific surfaces, under specified temperature and humidity conditions.

In order for permeability to be compared across different material formulations, water vapor permeability may also be represented or approximated by a quantity having the units grams times millimeters per square meter per twenty four hours $$\left(\frac{g \cdot mm}{m^2 \cdot 24 \text{ hrs}}\right)$$

at a given temperature and humidity, as is depicted in the graphs and tables of data accompanying this disclosure, where the water vapor characteristics for each side of the barrier, i.e., 0% relative humidity on one side and 90% relative humidity on the opposite side, and temperature are known. Water vapor permeability is a material property and does not depend on size, thickness or shape of the material. Water vapor permeability is a calculated value, while water vapor transmission rate or permeance is measured experimentally. Water vapor transmission rate (WVTR) is a property of an individual article and equal to the water vapor permeability (WVP) divided by the length of the path across which water vapor transmission occurs, e.g., the thickness of the article. In other words, water vapor transmission rate is represented as $$WVTR = \frac{WVP}{L}.$$

Water vapor permeability is a property of the material and gas/vapor combination and is calculated by multiplying the WVTR by the thickness of the measured article. Conceptually, water vapor permeability or the permeability of any permeant is the diffusivity times the solubility; however, a more detailed discussion of the concept of water vapor permeability is unnecessary.

For oxygen scavenging compositions, resins must be oxygen permeable. In view of the foregoing, polyolefin resins were selected as an option for the present oxygen absorbing composition as polyolefin resins are relatively low in cost and have high oxygen permeability. However, polyolefin resins have poor water vapor permeability. It has been found that the water vapor permeability of low density polyethylene (LDPE), polypropylene (PP), and other polyolefin resins may be increased in a variety of ways. It is known that crystallinity of the resins may be reduced by adding other materials to a particular resin, e.g., by adding linear low density polyethylene (LLDPE), plastomers or copolymers such as ethylene-vinyl acetate (EVA), ethylene acrylic acid (EAA) and ethyl methyl acrylate (EMA), thereby increasing the water vapor permeability of the resins. Similarly, permeability may be affected by processing conditions and other processes such as orientation. Moreover, polymers having different properties from LDPE, PP or polyolefin may be incorporated in the composition to change the water vapor permeability, e.g., polyether-block-polyamide, polyether-block-polyester polypropylene-block-polyether, and/or polyether thermoplastic polyurethane.

Oxygen Absorbing Composition

Water Insoluble Resin

An embodiment of the present invention provides an oxygen absorbing composition comprising a water insoluble resin comprising polyether and an oxygen absorber. The composition has a water vapor permeability greater than or equal to 0.040 grams-millimeters per square meter per twenty four hours $$\left(\frac{g \cdot mm}{m^2 \cdot 24 \text{ hrs}}\right)$$

at 5° C. and 90% relative humidity. The foregoing water vapor permeability is approximately three times the water vapor permeability of pure LDPE. It is believed that the minimum water vapor permeability of the present oxygen absorbing composition is necessary to provide an acceptable level of water vapor to activate the oxygen absorbers included in the oxygen absorbing composition. The minimum water vapor permeability is derived from various near 0° C. application requirements, i.e., the temperature region where water may still exist in a liquid and gas phase, and water vapor and oxygen permeability are significantly lower than at ambient or room temperature conditions.

In some embodiments, the composition is melt processable. For example, the water insoluble resin may be a thermoplastic elastomer. Thermoplastic elastomers suitable for use in the present composition include but are not limited to polyether-block-polyamide block copolymer, polypropylene-block-polyether block copolymer, polyether-block-polyester block copolymer, thermoplastic urethane (containing polyether glycol or polyoxyethylene) and combinations thereof. Suitable resins comprise a polyether group. The polyether group is included to make the resin more hygroscopic while its content amount is such that resin is insoluble in water and preferably melt or thermally processable. An example of a polypropylene-block-polyether copolymer is PELESTAT® 230 sold by Sanyo Chemical Industries, Ltd. An example of a polyether-block-polyamide is certain grades of PEBAX® sold by Arkema such as PEBAX® MV 1074 SA01. An example of thermoplastic polyurethane that is water vapor permeable is Pellethane® 5863-90A sold by Lubrizol. The amount of water insoluble resin containing polyether ranges from 7.5 wt % to 70 wt %, preferred from 15 wt % to 50 wt %.

In some embodiments, the composition is not melt processable. For example, the water insoluble resin may be a urethane or an epoxy.

Additional Resins

In some embodiments, the oxygen absorbing composition further comprises an additional resin. The additional resin may include but is not limited to polyester, polyamide, polyethylene, polypropylene, copolymers of polyethylene, copolymers of polypropylene, grafted polyolefins (like maleic anhydride grafted); terpolymers like terpolymer of ethylene, acrylic ester, and glycidyl methacrylate, copolymers of polyamide, copolymers of polyester, and combinations thereof. In embodiments comprising polyethylene, the resin may include low density polyethylene (LDPE), medium density polyethylene (MDPE), high density polyethylene (HDPE), and combinations thereof.

As described above, some materials such as LDPE, polypropylene, copolymers of polyethylene, e.g., ethylene methyl acrylate, ethylene butyl acrylate, ethylene ethyl acrylate, and ethylene vinyl acetate, have lower than desired water vapor permeability, although oxygen permeability may be sufficient without the addition of materials to improve oxygen permeability. Considerations such as cost, level of extractables and water vapor/oxygen permeability control what additional resins are suitable and in what quantities the particular resins must be included. These additional resins can range from 0 wt % to 85 wt %, preferably from 0 wt % to 40 wt %.

Oxygen Absorbers

Oxygen absorbers of a variety of types may be incorporated within the present composition. For example, oxygen absorbers comprising a transition metal in combination with a metal halide have been found to perform well in the present composition. Acceptable performance has been obtained with iron as the transition metal; however, other transition metals may also be used, e.g., powdered zinc, manganese, copper, titanium. Some examples of suitable oxygen absorbers are described in U.S. Pat. Nos. 8,852,683; 8,343,626; 7,951,419 entitled "Dry-Coated Oxygen-Scavenging Particles and Methods of Making Them", which patents are incorporated herein by reference in their entireties.

The oxygen absorber must be dispersed within the resin. Some oxygen absorbers agglomerate and therefore various materials may be added to enhance dispersion of the absorbers. Materials used to enhance dispersion may be included in quantities less than 10 wt %, and are preferably included in quantities greater than 0 wt % and up to 1 wt %. Examples of such materials include but are not limited to mineral oil, low molecular weight polymers, stearates, fatty acids, and waxes with a polar group, e.g., oxidized polyethylene and maleated polypropylene. Example dispersants used in some embodiments of the present composition are Epolene E-14P and E-43P dispersants sold by Westlake Chemical. Various means have been used to incorporate a dispersant with an oxygen absorber, e.g., a shaker, a homogenizer or a mixer.

The oxygen absorber may be ascorbic acid. However, it is believed that ascorbic acid is only suitable in embodiments which are melt processable below the decomposition temperature of ascorbic acid. The decomposition temperature of ascorbic acid is dependent on the other components included in the blend, e.g., a catalyst such as copper decreases the decomposition temperature of ascorbic acid.

The amount of oxygen absorber used in the composition is dependent on various factors, such as amount of oxygen to be scavenged, part thickness and scavenging rate of oxygen required. The maximum amount of oxygen absorber used is 50 wt % of the composition; however, amounts less than or equal to 35 wt % of the composition are more typical.

Compatibilizers

In some embodiments, the composition further comprises a compatibilizer. Due to incompatibility between the water insoluble polyether containing resin and the additional resin or to control the dispersion of polyether containing resin, a compatibilizer may be used. A compatibilizer is an additive or resin chosen such that a component of it has affinity to a component in the water insoluble polyether containing resin and another component of it has affinity to the additional resin added. When a compatibilizer is used it can be a low molecular weight polymer or a high molecular weight polymer.

Suitable compatibilizers include but are not limited to ethylene methyl acrylate (EMA) copolymer, ethylene ethyl acrylate (EEA) copolymer, polyolefin copolymers containing unsaturated carboxylic acid, e.g., methacrylic acid, unsaturated carboxylic acid anhydride, e.g., maleic anhydride or unsaturated epoxide, e.g., glycidyl methacrylate, and combinations thereof. An example of an EMA copolymer is Lotryl® 20MA08 sold by Arkema, while an example of an EEA copolymer is Amplify™ EA102 sold by Dow Chemical of Midland, Michigan Additionally, other embodiments may include maleic anhydride grafted polyethylene, e.g., Amplify™ GR209 from Dow Chemical or like Orevac® OE850 from Arkema, and/or maleic anhydride grafted polypropylene, e.g., Eastman™ G3003 from Eastman chemical. It has been found that in three component polymer systems, e.g., pure polyolefin, such as LDPE, PP, with polyether containing polymers and a compatibilizer polymer, increasing the quantity of compatibilizer polymer to pure polyolefin for a given amount of polyether containing polymer in the composition increases the water vapor permeability of the composition. Compatibilizers also improve, control and/or stabilize domain size and dispersion of one material within another upon melting and solidification, e.g., polyether-block-polyamide block copolymer within LDPE. If the additional resin used is a copolymer of polyethylene such as EMA or EEA, or EVA (ethylene vinyl acetate; a copolymer of ethylene and vinyl acetate) then an additional compatibilizer may not be needed, or the compatibilizer may be a similar or different resin.

The amount of compatibilizer used may be 0 wt % to 50 wt % depending on the characteristics of the resin combination, preferably from 5 wt % to 20 wt %.

The water insoluble resin containing polyether and additional resin form immiscible polymer blends. It is desired that the water insoluble resin containing polyether is dispersed as a discontinuous phase within the additional resin. When a compatibilizer is used, it is used to control the domain size of the water insoluble resin containing polyether. The amounts of water insoluble resin containing polyether and additional resins, including the compatibilizer, are determined by the viscosity ratio of the water insoluble resin containing polyether and the additional resins. If $\varphi_1$ and $\varphi_2$ are the volume fractions of additional resins and water insoluble resin respectively then $$\phi_1 > \phi_2 \left( \frac{\eta_1}{\eta_2} \right) \quad (1)$$

where $\eta_1$ and $\eta_2$ are the melt viscosities of the additional resin and water insoluble resin containing polyether at the same shear rate and temperature. If melt densities of the polymers used during the processing temperature are known, then volume fractions can be determined from the weight fractions of the polymers.

Immiscible blend theory states that for cocontinuity, the following relationship is necessary:

$$\frac{\phi_2}{\phi_1} = \left( \frac{\eta_2}{\eta_1} \right)$$

If $$\frac{\phi_2}{\phi_1} > 1,$$

then the second resin is the continuous polymer, while if $$\frac{\phi_2}{\phi_1} < 1,$$

then the first resin is the continuous polymer.

Plasticizers

In some embodiments, the present oxygen absorbing composition further comprises a plasticizer. The primary role of all plasticizers as low molecular weight non-volatile additives is to improve the flexibility and processability of polymers by lowering the second order transition temperature, i.e., glass transition temperature ($T_g$). The extent of $T_g$ reduction in the presence of a plasticizer has been used as a parameter to assess the plasticization efficiency. When incorporated into a polymeric material, a plasticizer improves the workability and flexibility of the polymer by increasing the intermolecular separation of the polymer molecules. This results in a reduction in elastic modulus, tensile strength, polymer melt viscosity and $T_g$. The polymer toughness and flexibility is improved and lower thermal processing temperatures can be employed. Choice of a plasticizer is also based on its toxicity. Suitable hydrophobic plasticizers include but are not limited to dibutyl sebacate, triacetin, triethyl citrate, and combinations thereof.

It is shown here in examples that plasticizers can be included as a means of tailoring the water vapor permeability. The amount of plasticizer used is determined by its miscibility in the polymer, propensity to leach out (not desirable) and potentially overcoming anti-plasticization effects. It has been found that the present oxygen absorbing composition may include up to 8 wt % of a plasticizer or blend of plasticizers. When plasticizers are included, the plasticizers affect viscosities. This is accounted for in Equation (1) when volume fractions of each phase are being calculated.

Silica Gels

In some embodiments, the oxygen absorbing composition further comprises silica gel. It has been found that incorporating silica gel within the composition increases the water vapor permeability of the composition. Thus, silica gels are included as a means of tailoring the water vapor permeability.

The amount of silica gel used may range from 0 wt % to 25 wt %.

Other Materials

The oxygen absorbing composition may further comprise other materials that provide various functional and aesthetic characteristics to the composition. For example, in some embodiments, the composition comprises at least one of the following: colorant; pigment; and, processing aids. Processing aids may include but are not limited to lubricants, anti-statics, anti-blocks (prevent self-adhesion), etc.

Generally, the oxygen absorbing composition provides a solid continuous, i.e., nonporous, permeable phase. The composition is insoluble in water, has a low level of extractables and high water vapor permeability. In short, the present oxygen absorbing composition has no water soluble phases so that extraction is prevented.

Structures Comprising the Present Oxygen Absorbing Composition

Active Layer

An embodiment of the present invention provides oxygen absorbing film 20 comprising nonporous active layer 22. Active layer 22 comprises the present oxygen absorbing composition 24, i.e., water insoluble resin 26 comprising polyether and oxygen absorber 28. The film comprises a water vapor permeability rate greater than or equal to 0.040 grams-millimeters per square meter per twenty four hours $$\left( \frac{g \cdot mm}{m^2 \cdot 24 \text{ hrs}} \right)$$

at 5° C. and 90% relative humidity. It should be appreciated that the various embodiments of the present oxygen absorbing film may incorporate any of the embodiments of the present oxygen absorbing composition described above, and may further include various other layers as described below.

Skin Layer

In some embodiments, the present oxygen absorbing film, e.g., film 30, further comprises skin layer 32 comprising water insoluble resin 34 comprising polyether. It should be appreciated that film 30 may comprise a single skin layer 32 on one side of active layer 22, or alternatively, may comprise two skin layers 32 disposed on opposite sides of active layer 22. Skin layer 32 is a functional layer arranged to prevent extractables from active layer 22. Skin layer 32 is water vapor and oxygen permeable. In some embodiments, skin layer 32b has a greater water vapor and oxygen permeability than skin layer 32a, while in some embodiments, the water vapor and oxygen permeability of skin layers 32a and 32b are equal. Moreover, top skin layer 32a may also serve as an adhesion layer, e.g., securing multilayer structure 30 to a lidding stock, and bottom layer 32b may also serve as an adhesion layer, e.g., securing multilayer structure 30 to a cup or container.

Suitable water insoluble resins include but are not limited to thermoplastic elastomers such as polyether-block-polyamide block copolymer, polypropylene-block-polyether copolymer, polyether-block-polyester copolymer, copolymers of polyester and combinations thereof. In some embodiments, skin layer 32 further comprises a compatibilizer such as ethylene methyl acrylate (EMA) copolymer, ethylene ethyl acrylate (EEA) copolymer, and combinations thereof. In some embodiments, skin layer 32 further comprises an additional resin. The additional resin may include but is not limited to polyester, polyamide, polyethylene, polypropylene, copolymers of polyethylene, copolymers of polypropylene, copolymers of polyamide, and combinations thereof. In embodiments comprising polyethylene, the resin may include low density polyethylene (LDPE), medium density polyethylene (MDPE), high density polyethylene (HDPE), copolymers of polyethylene and combinations thereof.

In some embodiments, skin layer 32 comprises polypropylene and/or polyethylene, and in some of those embodiments oxygen absorbing film 30 further comprises adhesion promotion layer 36. Suitable adhesion promoters include but are not limited to maleated polyethylene and maleic anhydride Structural Layer In some embodiments, the oxygen absorbing film further comprises structural layer 38. Structural layer 38 has a first Young's modulus that is greater than the Young's modulus of active layer 22. Structural layer 38 may be rigid, semi-rigid or flexible. Suitable materials for use as structural layer 38 include but are not limited to polyethylene, polypropylene, polystyrene, amorphous polyethylene terephthalate (APET), glycol modified polyethylene terephthalate (PETG) and combinations thereof. It has been found that in some embodiments structural layers comprising polyethylene may also include filler. Suitable fillers include but are not limited to talc, calcium carbonate, barium sulfate, nanoclay, and combinations thereof.

Sealant Layer

In some embodiments, the oxygen absorbing film further comprises sealant layer 42. Sealant layer 42 may be formed from one of the following materials: polyethylene, e.g., LDPE; polypropylene; and, polyolefin. Characteristics of sealant layer 42 are dictated by the need to remain compatible with the materials attached to the sealant layer, e.g., active layer 22 and lid 44.

Example Structures

Generally, structures comprising the present oxygen absorbing composition are formed for a variety of purposes. The common goal with all structures is to transfer moisture and oxygen to the active layer in the shortest time possible, thereby maximizing the effectiveness of the structure as an oxygen absorber. Other layers, e.g., skin layers and structural layers provide different functional characteristics, e.g., minimizing extraction of material from the active layer or providing structural integrity for the structure. Thus, the layers included in addition to the active layer may also require formulation to optimize such desired functional characteristics.

Monolayer Structure

In some embodiments, a film in accordance with the present invention comprises a single active layer, e.g., active layer 22. Active layer 22 is formed from the oxygen absorbing composition described above. The volume of active layer 22 may be selected to satisfy a particular use. For example, a larger volume will have a higher absorbing capacity than a smaller volume of the same material. Additionally, larger exposed surface area will facilitate faster uptake of water vapor and oxygen. Thus, the ratio of surface area to volume may be selected to provide a desired speed of uptake and total overall capacity.

Multilayer Structure

In some embodiments, a multilayer structure is formed from at least one skin layer 32 attached to active layer 22, e.g., multilayer structure 30. It should be appreciated that depending on the use of the structure, there may be one skin layer 32 attached to active layer 22, or alternatively, structure 30 may comprise first skin layer 32a attached to active layer 22 and second skin layer 32b attached to the side of active layer 22 opposite first skin layer 32a. Top skin layer 32a may also serve as an adhesion layer, e.g., securing multilayer structure 30 to a lidding stock, and bottom layer 32b may also serve as an adhesion layer, e.g., securing multilayer structure 30 to a cup or container.

If secured or attached to another article or container, skin layers 32a and 32b must be compatible with the attached article or container. Moreover, skin layers 32a and 32b must be formulated to minimize or prevent entirely the extraction of oxygen absorbing material from active layer 22.

In some embodiments, e.g., multilayer structure 30, at least one of the skin layers 32a and 32b may not sufficiently bond to active layer 22, e.g., skin layer 32b does not adhere to active layer 22. In these embodiments, adhesive layer 36 is disposed between active layer 22 and skin layer 32b. Adhesive layer 36 may be an adhesive, e.g., an epoxy, a melt extruded adhesive such as a functionalized polyolefin, olefinic block copolymers, or an aqueous or solvent processed layer such as polyurethane dispersions, polyethylene imine dispersions or a hot melt adhesive. Alternatively, adhesive layer 36 may be an adhesion promoter, i.e., a composition which modifies the surface of active layer 22 thereby causing a greater bond strength between active layer 22 and a skin layer. Examples of suitable adhesion promoters include but are not limited to functionalized polyolefin, olefinic block copolymers In some embodiments, the present multilayer structure comprises sealant layer 42, active layer 22 and structural layer 38, e.g., multilayer structure 40. Multilayer structure 40 may be a tray or a container. The sealant layer is a skin layer in the structure with a functionality that enables the oxygen scavenging film to adhere to different surfaces like lid 44. Furthermore this sealant layer's properties are tailored depending on the surface it is supposed to adhere to. Active layer 22 is substantially similar to the embodiments described above with respect to the various embodiments of the present oxygen absorbing composition. Structural layer 38 provides a form within which a subsequent material may be contained, e.g., food product, pharmaceutical, etc. Structural layer 38 is generally stiffer than the other elements of the multilayer structure, e.g., active layer 22 and skin layer 42 which performs the function of a sealant layer 42. Stiffness is a function of tensile (Young's) modulus and thickness. Described in different terms, for a given thickness, the Young's modulus of structural layer 38 is greater than the Young's modulus of sealant layer 42 and greater than the Young's modulus of active layer 22. Structural layer 38 may be a foamed sheet, a filled film or sheet, resin composition containing inorganic fillers such as calcium carbonate, talc, or a resin that has higher modulus than the active layer and sealant layer, and is typically rigid or semi-rigid. The term sealant layer means the layer adhering to a container such as a cup or tray. A sealant layer in the present multilayer oxygen absorbing films or sheet will be disposed on the outside so that it acts as a skin layer that performs the function of sealing to a container or a device.

In some embodiments, the present multilayer structure is multilayer nonporous oxygen absorbing structure, such as structure 100, that resists delamination. Structure 100 comprises first layer 102 comprising first continuous polymer phase 104, first water insoluble, dispersed, polyether resin phase 106 in first continuous polymer phase 104, and water activated oxygen absorber 108. Structure 100 further comprises second layer 110 comprising second continuous polymer phase 112, bonded to first layer 102. In some embodiments, structure 100 further comprises third layer 114 comprising third continuous polymer phase 116 and second water insoluble, dispersed, polyether resin phase 118 in third continuous polymer phase 116, bonded to first layer 102 opposite second layer 110.

Example Uses

Figure 3:
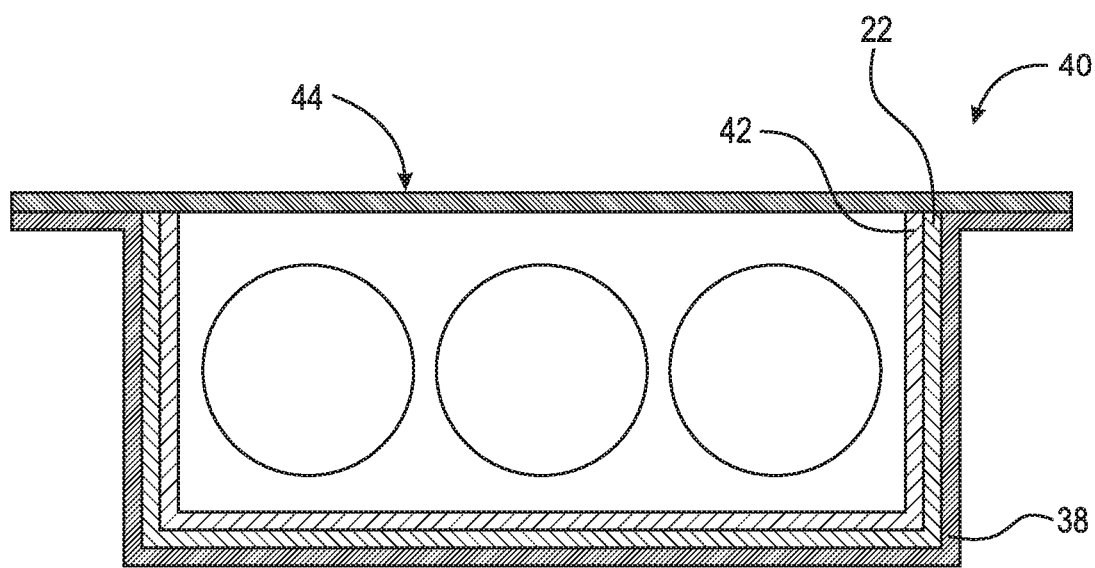
FIG. 3 is a cross-sectional view of another embodiment of an oxygen absorbing film, i.e., a structure comprising a sealant layer, an active layer and a structural layer.
Figure 4:
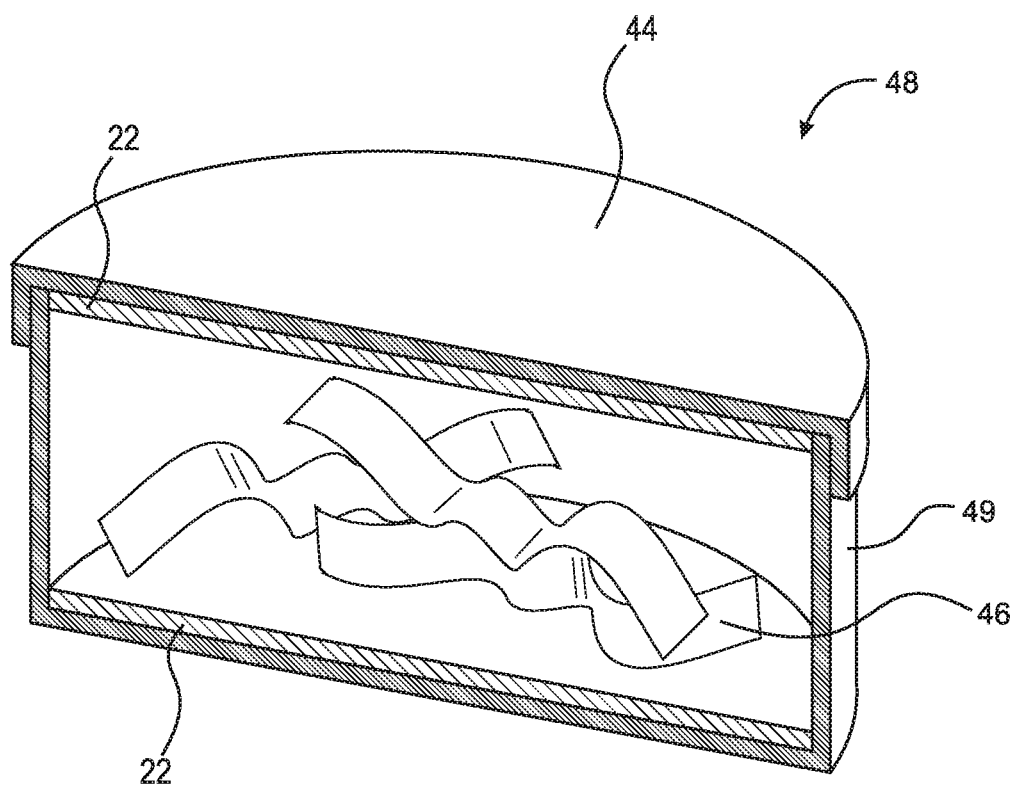
FIG. 4 is a cross-sectional view of a container including a sheet layer of an oxygen absorbing composition arranged therein and further including a food product, e.g., beef jerky.

The oxygen absorbing composition and formed structures have a variety of uses. Materials that must be protected from oxygen and include some quantity of water vapor can benefit from the composition and structures. A typical use of the foregoing includes increasing the shelf life of food products such as beef jerky, cheeses and deli meats, nutritional bars that benefit from reduced oxygen while retaining a desired amount of moisture. The present oxygen absorbing composition may form a food packaging insert (See active layer 22 below beef jerky 46 in FIG. 4), a bottom tray/container (See multilayer structure 40 in FIG. 3), a lid stock (See active layer 22 below lid 44 in FIG. 4) or a portion of a packaging film that surround a nutritional bar. The packaging film could comprise a metallized polyester film or a multilayer packaging film to which is adhered the present multilayer oxygen absorbing structure. It should be appreciated that container 48 may be formed from base portion 49 and lid 44, and that base 49 and lid 44 may be formed from conventional resin materials, or any other suitable material in view of the application. A food packaging insert, i.e., the lower active layer 22 may be simply placed in base portion 49 or secured to base portion 49 via adhesive, sonic welding, etc. Similarly, lid 44 may include active layer 22 secured thereto or alternatively, active layer 22 may be secured to base portion 49 prior to closing of container 48 with lid 44.

A variety of embodiments of the present oxygen absorbing composition have been made and tested for water vapor permeability. Those examples are summarized in the following tables. It should be noted that the values in Tables 1-7 represent the mass fraction of each material included in each example. The LDPE used was Dow Chemical's LDPE640I resin, the PP was Flint Hills Resources' P4G3Z-039, the polyether-block-polyamide block copolymer was Arkema's PEBAX® MV 1074 SA 01, the polypropylene-block-polyether block copolymer was Sanyo Chemical's PELESTAT® 230, the EMA used was Arkema's LOTRYL® 20MA08, the silica gel used was PQ Corporation's Gasil Silica 200DF, the dibutyl sebacate (DBS) used was from Sigma Aldrich (product SKU 84840), the triacetin (TA) used was from Sigma Aldrich (product SKU W20070-1), and the triethyl citrate (TEC) used was from Sigma Aldrich (product SKU W308307).

The resin compositions with various additives were mixed in a co-rotating intermeshing twin screw extruder like the ZSK-25 from Coperion corporation or ZSK-27 from American Leistritz. The pellets obtained from the compounding operation were then extruded on a single screw extruder like a 0.01905 m Randcastle extruder provided with a 0.2032 m wide die to make films. These films were characterized for water vapor transmission rate on a Mocon Permatran-W® 3/33 unit used under at least two different conditions: ambient temperature 23° C. @ 90% RH and to simulate refrigeration temperature 5° C. @ 90% RH.

TABLE 1

| Ex. | LDPE 6401 | PEBAX® | Lotryl® | Permeability $\left(\frac{g \cdot mm}{m^2 \cdot 24\ hrs}\right)$ @ 23° C., 90% RH | WVTR $\left(\frac{g}{m^2 \cdot 24\ hrs}\right)$ @ 23° C., 90% RH | Permeability $\left(\frac{g \cdot mm}{m^2 \cdot 24\ hrs}\right)$ @ 5° C., 90% RH | WVTR $\left(\frac{g}{m^2 \cdot 24\ hrs}\right)$ @ 5° C., 90% RH |
|---|---|---|---|---|---|---|---|
| 1 | 1.000 | | | 0.092 | 0.706 | 0.030 | 0.215 |
| 2 | 1.000 | | | 0.091 | 0.703 | 0.014 | 0.115 |
| 3 | 1.000 | | | | | 0.013 | 0.104 |
| 4 | 0.925 | 0.075 | | 0.099 | 0.135 | 0.015 | 0.117 |
| 5 | 0.850 | 0.150 | | 0.118 | 0.240 | 0.013 | 0.090 |
| 6 | 0.750 | 0.250 | | 0.147 | 1.344 | 0.012 | 0.084 |
| 7 | 0.925 | | 0.075 | 0.096 | 0.741 | 0.013 | 0.085 |
| 8 | 0.775 | 0.150 | 0.075 | 0.134 | 1.034 | 0.014 | 0.112 |
| 9 | 0.600 | 0.150 | 0.250 | 0.226 | 2.053 | | |
| 10 | 0.600 | 0.150 | 0.250 | 0.222 | 2.020 | | |
| 11 | 0.400 | 0.350 | 0.250 | 2.019 | | 0.337 | 2.806 |
| 12 | 0.400 | 0.350 | 0.250 | | | 0.281 | 2.321 |
| 13 | 0.379 | 0.3684 | 0.2526 | 3.231 | 19.003 | | |
| 14 | 0.379 | 0.3684 | 0.2526 | 3.403 | 20.026 | | |
| 15 | 0.250 | 0.500 | 0.250 | 47.834 | 381.401 | 22.746 | 175.081 |
| 16 | 0.250 | 0.500 | 0.250 | | | 25.326 | 195.022 |
| 17 | 0.500 | 0.250 | 0.250 | 0.378 | 2.927 | 0.0545 | 0.419 |
| 18 | 0.500 | 0.250 | 0.250 | | | 0.0547 | 0.384 |

TABLE 1-continued

| Ex. | LDPE 6401 | PEBAX ® | Lotryl ® | Permeability $\left(\frac{g \cdot mm}{m^2 \cdot 24 \text{ hrs}}\right)$ @23° C., 90% RH | WVTR $\left(\frac{g}{m^2 \cdot 24 \text{ hrs}}\right)$ @23° C., 90% RH | Permeability $\left(\frac{g \cdot mm}{m^2 \cdot 24 \text{ hrs}}\right)$ @5° C., 90% RH | WVTR $\left(\frac{g}{m^2 \cdot 24 \text{ hrs}}\right)$ @5° C., 90% RH |
|---|---|---|---|---|---|---|---|
| 19 | 0.250 | 0.250 | 0.500 | 1.253 | | 0.176 | 1.354 |
| 20 | 0.250 | 0.250 | 0.500 | 1.235 | 8.818 | 0.126 | 0.968 |
| 21 | 0.350 | 0.150 | 0.500 | 0.431 | 3.590 | | |
| 22 | 0.350 | 0.150 | 0.500 | 0.391 | 3.505 | | |

TABLE 2

| Ex. | LDPE 6401 | PEBAX ® | Lotryl ® | DBS | Permeability $\left(\frac{g \cdot mm}{m^2 \cdot 24 \text{ hrs}}\right)$ @23° C., 90% RH | WVTR $\left(\frac{g}{m^2 \cdot 24 \text{ hrs}}\right)$ @23° C., 90% RH |
|---|---|---|---|---|---|---|
| 23 | 0.350 | 0.350 | 0.250 | 0.050 | 3.467 | 23.113 |
| 24 | 0.350 | 0.350 | 0.250 | 0.050 | 3.405 | 22.701 |
| 25 | 0.325 | 0.350 | 0.250 | 0.075 | 2.222 | 24.689 |
| 26 | 0.325 | 0.350 | 0.250 | 0.075 | 2.184 | 18.197 |

TABLE 3

| Ex. | LDPE 6401 | PEBAX ® | Lotryl ® | TA | Permeability $\left(\frac{g \cdot mm}{m^2 \cdot 24 \text{ hrs}}\right)$ @23° C., 90% RH | WVTR $\left(\frac{g}{m^2 \cdot 24 \text{ hrs}}\right)$ @23° C., 90% RH |
|---|---|---|---|---|---|---|
| 27 | 0.350 | 0.350 | 0.250 | 0.050 | 13.697 | 99.207 |
| 28 | 0.350 | 0.350 | 0.250 | 0.050 | 11.372 | 85.977 |
| 29 | 0.325 | 0.350 | 0.250 | 0.075 | 14.224 | 127.558 |
| 30 | 0.325 | 0.350 | 0.250 | 0.075 | 12.947 | 122.958 |

TABLE 4

| Ex. | LDPE 6401 | PEBAX ® | Lotryl ® | TEC | Permeability $\left(\frac{g \cdot mm}{m^2 \cdot 24 \text{ hrs}}\right)$ @23° C., 90% RH | WVTR $\left(\frac{g}{m^2 \cdot 24 \text{ hrs}}\right)$ @23° C., 90% RH |
|---|---|---|---|---|---|---|
| 31 | 0.350 | 0.350 | 0.250 | 0.050 | 7.834 | 71.146 |
| 32 | 0.350 | 0.350 | 0.250 | 0.050 | 6.922 | 63.702 |
| 33 | 0.325 | 0.350 | 0.250 | 0.075 | 4.045 | 30.985 |
| 34 | 0.325 | 0.350 | 0.250 | 0.075 | 3.309 | 25.056 |

TABLE 5

| Ex. | LDPE 6401 | PEBAX ® | Silica | Permeability $\left(\frac{g \cdot mm}{m^2 \cdot 24 \text{ hrs}}\right)$ @23° C., 90% RH | Permeability $\left(\frac{g \cdot mm}{m^2 \cdot 24 \text{ hrs}}\right)$ @5° C., 90% RH | WVTR $\left(\frac{g}{m^2 \cdot 24 \text{ hrs}}\right)$ @5° C., 90% RH |
|---|---|---|---|---|---|---|
| 35 | 0.675 | 0.250 | 0.075 | 0.208 | | |
| 36 | 0.675 | 0.250 | 0.075 | 0.189 | | |
| 37 | 0.600 | 0.250 | 0.150 | 0.356 | | |

TABLE 5-continued

| Ex. | LDPE 6401 | PEBAX ® | Silica | Permeability $\left(\frac{g \cdot mm}{m^2 \cdot 24 \text{ hrs}}\right)$ @23° C., 90% RH | Permeability $\left(\frac{g \cdot mm}{m^2 \cdot 24 \text{ hrs}}\right)$ @5° C., 90% RH | WVTR $\left(\frac{g}{m^2 \cdot 24 \text{ hrs}}\right)$ @5° C., 90% RH |
|---|---|---|---|---|---|---|
| 38 | 0.500 | 0.350 | 0.150 | 0.610 | 0.101 | 0.844 |
| 39 | 0.500 | 0.350 | 0.150 | | 0.103 | 0.848 |

TABLE 6

| Ex. | PP | PEBAX® | Lotryl ® | Permeability $\left(\frac{g \cdot mm}{m^2 \cdot 24 \text{ hrs}}\right)$ @23° C., 90% RH | WVTR $\left(\frac{g}{m^2 \cdot 24 \text{ hrs}}\right)$ @23° C., 90% RH | Permeability $\left(\frac{g \cdot mm}{m^2 \cdot 24 \text{ hrs}}\right)$ @5° C., 90% RH | WVTR $\left(\frac{g}{m^2 \cdot 24 \text{ hrs}}\right)$ @5° C., 90% RH |
|---|---|---|---|---|---|---|---|
| 40 | 0.400 | 0.350 | 0.250 | 0.682 | 11.360 | | |
| 41 | 0.400 | 0.350 | 0.250 | 0.684 | 11.268 | | |
| 42 | 0.250 | 0.500 | 0.250 | 28.198 | 562.919 | 11.208 | 224.508 |
| 43 | 0.250 | 0.500 | 0.250 | 26.715 | 538.058 | 10.820 | 213.684 |
| 44 | 1.000 | | | 0.056 | 1.876 | 0.009 | 0.311 |
| 45 | 1.000 | | | 0.064 | 1.614 | 0.010 | 0.244 |

TABLE 7

| Ex. | PP | Pelestat ® | Permeability $\left(\frac{g \cdot mm}{m^2 \cdot 24 \text{ hrs}}\right)$ @23° C., 90% RH |
|---|---|---|---|
| 46 | 0.700 | 0.300 | 3.961 |
| 47 | 0.700 | 0.300 | 3.476 |
| 48 | 0.300 | 0.700 | 93.331 |
| 49 | 0.300 | 0.700 | 95.433 |

Figure 5:
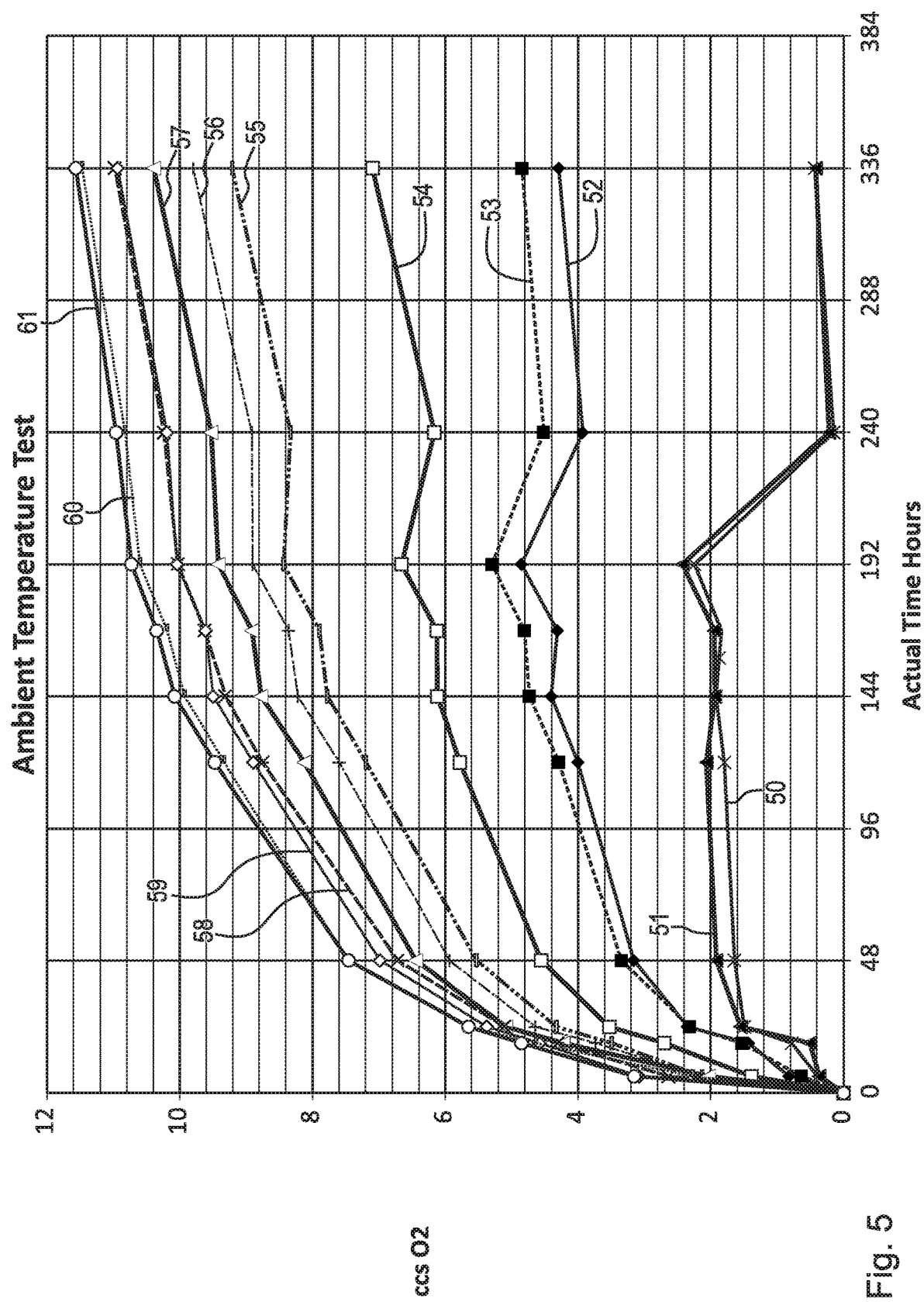
FIG. 5 is a graph representing performance of various embodiments of the present oxygen absorbing composition tested at ambient temperature conditions.
Figure 6:
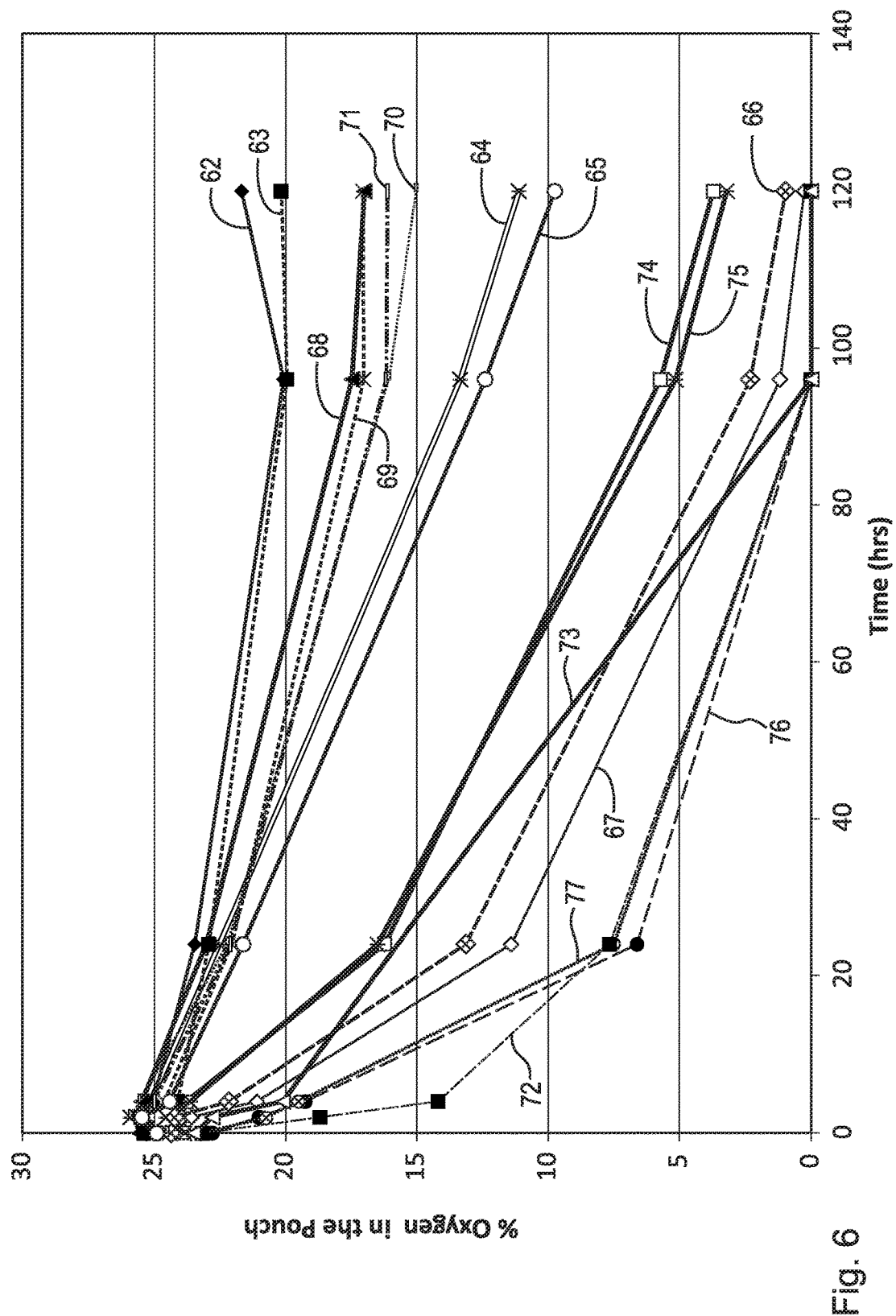
FIG. 6 is a graph representing performance of various embodiments of the present oxygen absorbing composition tested at refrigeration temperature conditions; and, FIG. 7 is a cross-sectional view of another embodiment of an oxygen absorbing film, i.e., a structure comprising an active layer and two oppositely disposed skin layers.
Figure 7:
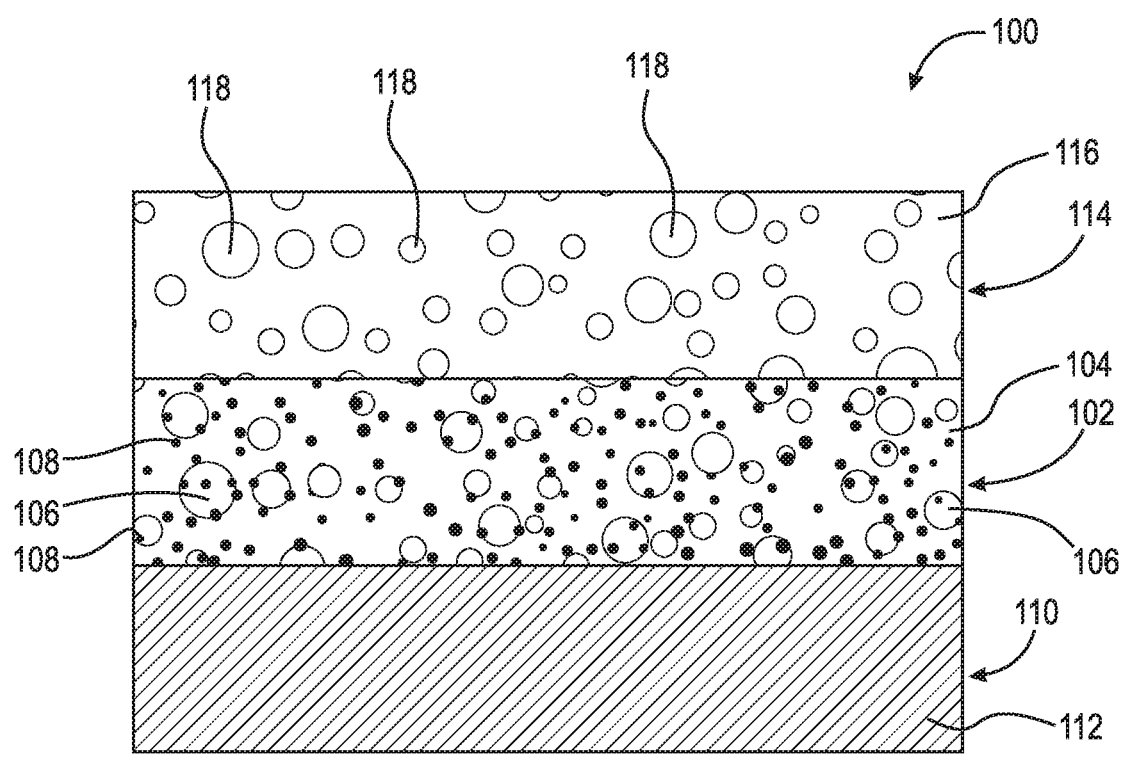

Various embodiments of the present oxygen absorbing composition were tested for the quantities of oxygen absorbed under ambient and refrigeration temperature conditions. FIG. 5 represents the performance at ambient temperature conditions, while FIG. 6 represents performance at refrigeration temperature conditions.

Each embodiment of the present oxygen absorbing composition was formed in a sheet approximately 0.013 inches thick. For each test run, a piece of an oxygen absorbing sheet 2.5 inches in diameter was placed inside a four inch by eight inch pouch. Each pouch was filled with sixty milliliters of oxygen and then sealed. The absorption of oxygen by each embodiment of the present oxygen absorbing composition was then measured over a period of three hundred thirty six hours at a room temperature of approximately 23° C. The following table provides a description of each embodiment of the present oxygen absorbing composition wherein each component quantity is described in terms of the mass fraction.

TABLE 8

| Ex. | LDPE | PP | Breathable resin (PEBAX ® MV1074SA01) | Compatibilizer (Lotryl ® 20MA08) | FreshBlend ® Oxygen absorber (iron coated with electrolytes and acidifying agents) | Dispersant |
|---|---|---|---|---|---|---|
| 50 | | 0.840 | | | 0.150 | 0.010 (E43P) |
| 51 | | 0.840 | | | 0.150 | 0.010 (E14P) |
| 52 | 0.840 | | | | 0.150 | 0.010 (E14P) |
| 53 | 0.840 | | | | 0.150 | 0.010 (E43P) |
| 54 | | 0.336 | 0.294 | 0.210 | 0.150 | 0.010 (E43P) |
| 55 | | 0.336 | 0.294 | 0.210 | 0.150 | 0.010 (E14P) |
| 56 | 0.336 | | 0.294 | 0.210 | 0.150 | 0.010 (E43P) |
| 57 | | 0.1925 | 0.385 | 0.1925 | 0.220 | 0.010 (E43P) |
| 58 | 0.336 | | 0.294 | 0.210 | 0.150 | 0.010 (E14P) |
| 59 | | 0.1925 | 0.385 | 0.1925 | 0.220 | 0.010 (E14P) |
| 60 | 0.1925 | | 0.385 | 0.1925 | 0.220 | 0.010 (E43P) |
| 61 | 0.1925 | | 0.385 | 0.1925 | 0.220 | 0.010 (E14P) |

Each embodiment of the present oxygen absorbing composition was formed in a sheet approximately 0.001 to 0.006 inches thick and a skin layer was laminated to the sheet on one side. On the side opposite to the skin layer a metallized polyester film was laminated. Thus, the active layer was sandwiched between the skin layer and metallized polyester film. The total film thickness of the laminated package ranged from 0.0058 mil to 0.0085 mil thick. For each test run, a piece of this laminated oxygen absorbing film 3.78 inches by 3.78 inches and 1 gram of water on a blotter paper were placed inside a 4.75 inch by 5.75 inch pouch. Each pouch was filled with ten cubic centimeters of ambient air having twenty percent oxygen and then sealed. The samples were placed in a refrigerator whose set point was set at 3° C. The absorption of oxygen by each embodiment of the present oxygen absorbing composition was then measured over a period of one hundred twenty hours. Table 9 provides a description of each embodiment of the present oxygen absorbing composition wherein each component quantity is described in terms of the mass fraction. Table 10 provides a description of each embodiment of the skin layer attached to the oxygen absorbing composition wherein each component quantity is described in terms of the mass fraction.

TABLE 9

| Ex. | LDPE | PP | Breathable resin (PEBAX® MV1074SA01) | Compatibilizer (Lotryl® 20MA08) | FreshBlend® Oxygen absorber (iron coated with electrolytes and acidifying agents) | Dispersant |
| --- | --- | --- | --- | --- | --- | --- |
| 62 | 0.840 | | | | 0.150 | 0.010 (E43P) |
| 63 | 0.840 | | | | 0.150 | 0.010 (E43P) |
| 64 | 0.336 | 0.294 | 0.210 | | 0.150 | 0.010 (E43P) |
| 65 | 0.336 | 0.294 | 0.210 | | 0.150 | 0.010 (E43P) |
| 66 | 0.1925 | 0.385 | 0.1925 | | 0.220 | 0.010 (E43P) |
| 67 | 0.1925 | 0.385 | 0.1925 | | 0.220 | 0.010 (E43P) |
| 68 | 0.840 | | | | 0.150 | 0.010 (E14P) |
| 69 | 0.840 | | | | 0.150 | 0.010 (E14P) |
| 70 | 0.840 | | | | 0.150 | 0.010 (E43P) |
| 71 | 0.840 | | | | 0.150 | 0.010 (E43P) |
| 72 | 0.1925 | | 0.385 | 0.1925 | 0.220 | 0.010 (E43P) |
| 73 | 0.1925 | | 0.385 | 0.1925 | 0.220 | 0.010 (E43P) |
| 74 | 0.336 | | 0.294 | 0.210 | 0.150 | 0.010 (E43P) |
| 75 | 0.336 | | 0.294 | 0.210 | 0.150 | 0.010 (E43P) |
| 76 | 0.1925 | | 0.385 | 0.1925 | 0.220 | 0.010 (E43P) |
| 77 | 0.1925 | | 0.385 | 0.1925 | 0.220 | 0.010 (E43P) |

TABLE 10

| Ex. | LDPE | PP | Breathable resin (PEBAX® MV1074SA01) | Compatibilizer (Lotryl® 20MA08) |
| --- | --- | --- | --- | --- |
| 62 | | 1.000 | | |
| 63 | | 1.000 | | |
| 64 | | 0.400 | 0.350 | 0.250 |
| 65 | | 0.400 | 0.350 | 0.250 |
| 66 | | 0.250 | 0.500 | 0.250 |
| 67 | | 0.250 | 0.500 | 0.250 |
| 68 | 1.000 | | | |
| 69 | 1.000 | | | |
| 70 | 1.000 | | | |
| 71 | 1.000 | | | |
| 72 | 0.250 | | 0.500 | 0.250 |
| 73 | 0.250 | | 0.500 | 0.250 |
| 74 | 0.400 | | 0.350 | 0.250 |
| 75 | 0.400 | | 0.350 | 0.250 |
| 76 | 0.250 | | 0.500 | 0.250 |
| 77 | 0.250 | | 0.500 | 0.250 |

The effect of film formulation for layer adhesion to lidding stock and an active layer. For the purpose of the following testing, a two or three layer film structure was created. All the film structures consisted of a polymer layer containing the oxygen absorber and also the polyether containing resin—also known as active layer. For the case of a three layer film structure, the active layer (layer 1) is sandwiched between the two polymer layers, one known as the permeable layer (layer 2) and the other known as the lid stock layer (layer 3). The permeable layer (layer 2) and lid stock layer (layer 3) are the skin layers surrounding the active layer. Here for the case of a two layer film structure, the active layer was adhered to the lid stock layer. These two or three layer film structures were created by coextrusion or by lamination. Furthermore, these two or three layer structures were laminated to metallized PET film in an Akiles lab laminator at 140° C., set at a speed of 3. These were exposed to different temperatures and humidity conditions and observed for delamination. The data included in Tables 11 and 12 below summarizes the compositions created and results of the delamination testing.

TABLE 11

| Ex. | Formation technique | Lid stock layer | Active layer | Permeable layer |
|---|---|---|---|---|
| 78 | Coextruded | 40.2% PP, 59.8% Lotryl 20MA08 | 21.15% PP, 42.3% Pebax MV1074, 21.15% Lotryl 20MA08, 14.74% iron, 0.66% Epolene E14P | 25% PP, 50% Pebax MV1074, 25% Lotryl 20MA08 |
| 79 | Coextruded | 19.8% PP, 80.2% Lotryl 20MA08 | 21.15% PP, 42.3% Pebax MV1074, 21.15% Lotryl 20MA08, 14.74% iron, 0.66% Epolene E14P | 25% PP, 50% PEbax MV1074, 25% Lotryl 20MA08 |
| 80 | Laminated | 33.0% PP, 67.0% Lotryl 20MA08 | 21.15% PP, 42.3% Pebax MV1074, 21.15% Lotryl 20MA08, 14.74% iron, 0.66% Epolene E14P | |
| 81 | Laminated | 33.0% PP, 67.0% Lotryl 20MA08 | 21.15% PP, 42.3% Pebax MV1074, 21.15% Lotryl 20MA08, 14.74% iron, 0.66% Epolene E14P | |
| 82 | Laminated | 33.0% PP, 67.0% Lotryl 20MA08 | 21.15% PP, 42.3% Pebax MV1074, 21.15% Lotryl 20MA08, 14.74% iron, 0.66% Epolene E14P | |
| 83 | Laminated | 33.0% PP - PDP4G3Z03960, 67.0% Lotryl 20MA08 | 63.0% Lotryl 20MA08, 21.0% Pebax MV1074, 15.0% iron blend, 1.0% Epolene E14P | 67.5% Lotryl 20MA08, 22.5% Pebax MV1074, 10% polybutene |
| 84 | Laminated | 33.0% PP - PDP4G3Z03960, 67.0% Lotryl 20MA08 | 63.0% Lotryl 20MA08, 21.0% Pebax MV1074, 15.0% iron blend, 1.0% Epolene E14P | 63.75% Lotryl 20MA08, 21.25% Pebax MV1074, 15% polybutene |
| 85 | Laminated | 33.0% PP - PDP4G3Z03960, 67.0% Lotryl 20MA08 | 71.4% Lotryl 20MA08, 12.6% Pebax MV1074, 15.0% iron blend, 1.0% Epolene E14P | 76.5% Lotryl 20MA08, 13.5% Pebax MV1074, 10% polybutene |
| 86 | Laminated | 33.0% PP - PDP4G3Z03960, 67.0% Lotryl 20MA08 | 54.6% Lotryl 20MA08, 29.4% Pebax MV1074, 15.0% iron blend, 1.0% Epolene E14P | 58.5% Lotryl 20MA08, 31.5% Pebax MV1074, 10% polybutene |
| 87 | Laminated | 76.5% Lotryl 20MA08, 13.5% Pebax, 10% polybutene | 71.4% Lotryl 20MA08, 12.6% Pebax MV1074, 15.0% iron blend, 1.0% Epolene E14P | 76.5% Lotryl 20MA08, 13.5% Pebax MV1074, 10% polybutene |
| 88 | Coextruded | 28.0% PP - PDP4G3Z03960, 67.0% Lotryl 20MA08, 5% Epolene E43P (0.5 mil thick) | 54.6% Lotryl 20MA08, 29.4% Pebax MV1074, 15.0% iron blend, 1.0% Epolene E14P (1 mil thick) | 60.3% Lotryl 20MA08, 29.7% Pebax MV1074, 10% polybutene PB8640M (0.5 mil thick) |
| 89 | Coextruded | 28.0% PP - PDP4G3Z03960, 67.0% Lotryl 20MA08, 5% Epolene E43P (1.0 mil thick) | 54.6% Lotryl 20MA08, 29.4% Pebax MV1074, 15.0% iron blend, 1.0% Epolene E14P (1 mil thick) | 60.3% Lotryl 20MA08, 29.7% Pebax MV1074, 10% polybutene PB8640M (1.0 mil thick) |
| 90 | Coextruded | 28.0% PP - PDP4G3Z03960, 67.0% Lotryl 20MA08, 5% Epolene E43P (0.5 mil thick) | 50.4% Lotryl 20MA08, 33.6% Pebax MV1074, 15.0% iron blend, 1.0% Epolene E14P (1 mil thick) | 56.95% Lotryl 20MA08, 28.05% Pebax MV1074, 15% polybutene PB8640M (0.5 mil thick) |

TABLE 12

Exposed to different environments and evaluated for adhesion

| Ex. | Comments | 25° C., 80% RH, 7 days | 40° C., 75% RH, 7 days | 5° C., 95% RH, 7 days | Room temperature, 90% RH, 7 days |
|---|---|---|---|---|---|
| 78 | The 3 layers coextruded with active layer sandwiched between lidstock layer and permeable layer. The other side of lidstock layer laminated to metallized PET | | | Delamination between active layer and permeable layer | |
| 79 | Same as Ex. 78 | | | Delamination between active layer and permeable layer | |
| 80 | One side of lidstock layer laminated to metallized PET and other side laminated to active layer which is laminated to permeable layer | | | Slight delamination | |
| 81 | Same as Ex. 80 | | | No delamination | |
| 82 | Same as Ex. 80 | | | No delamination | |
| 83 | Same as Ex. 80 | No delamination | No delamination | | |
| 84 | Same as Ex. 80 | No delamination | No delamination | | |
| 85 | Same as Ex. 80 | No delamination | No delamination | | |
| 86 | Same as Ex. 80 | No delamination | No delamination | | |
| 87 | Same as Ex. 80 | No delamination | No delamination | | |
| 88 | Same as Ex. 78 | | | No delamination | No delamination |
| 89 | Same as Ex. 78 | | | No delamination | |
| 90 | Same as Ex. 78 | | | No delamination | |

Based on the results experimental results described above, a three layer film structures was coextruded and heat laminated to metallized PET film. Layer 3 was adhered to the metallized PET film. This laminated structure was characterized for oxygen scavenging. The structure and its associated formation is described in Table 13 below, while its oxygen scavenging is set forth in Table 14.

TABLE 13

| Ex. | Formation technique | Layer 3 (target thickness: 0.5 mil) | Layer 1 (target thickness: 1 mil) | Layer 2 (target thickness: 0.5 mil) |
|---|---|---|---|---|
| 91 | Coextruded | 28% PP, 67.5% Lotryl 20MA08, 5% Epolene E43P | 29.4% Pebax MV1074, 54.6% Lotryl 20MA08, 15% iron, 1% Epolene E14P | 29.7% Pebax MV1074, 60.3% Lotryl 20MA08, 10% Polybutene PB8640M |

TABLE 14

| | Oxygen Absorption (cc) | | | | | | |
|---|---|---|---|---|---|---|---|
| Ex. | 0 hrs | 48 hrs | 72 hrs | 96 hrs | 120 hrs | 168 hrs | 336 hrs |
| 91 | 0.00 | 1.87 | 2.45 | 2.84 | 3.08 | 3.39 | 3.57 |

It has been found that delamination at high humidities is prevented by the selection of polymers and their relative ratios. Proper formation and formulation of the present composition ensures that the hydrophilic polymer is the dispersed polymer phase within the hydrophobic continuous polymer phase. The foregoing composition prevents delamination of the structure. It was found that a hydrophilic continuous phase typically resulted in delamination in a multilayer structure.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A multilayer nonporous oxygen absorbing structure comprising:
    a first layer comprising a first continuous polymer phase, a first water insoluble, dispersed, polyether resin phase in the first continuous polymer phase, and a water activated oxygen absorber; and,
    a second layer comprising a second continuous polymer phase, bonded to the first layer,
    wherein, the first continuous polymer phase and the first water insoluble, dispersed, polyether resin phase form an immiscible polymer blend,
    wherein, an amount of the first water insoluble, dispersed, polyether resin phase and an amount of the first continuous polymer phase is determined by a viscosity ratio of the first water insoluble, dispersed, polyether resin phase and the first continuous polymer phase according to the equation:

$$\phi_1 > \phi_2 \left( \frac{\eta_1}{\eta_2} \right),$$

where $\phi_1$ and $\phi_2$ are the volume fractions of the first continuous polymer phase and the first water insoluble, dispersed polyether resin phase, respectively, and $\eta_1$ and $\eta_2$ are melt viscosities of the first continuous polymer phase and the first water insoluble, dispersed, polyether resin phase at the same shear rate and temperature, respectively, and
    wherein, the first layer has a water vapor permeability greater than or equal to 0.040

$$\left( \frac{g \cdot mm}{m^2 \cdot 24 \text{ hrs}} \right)$$

at 5° C. and 90% relative humidity and less than 0.682

$$\left( \frac{g \cdot mm}{m^2 \cdot 24 \text{ hrs}} \right)$$

at 23° C. and 90% relative humidity.

2. The multilayer nonporous oxygen absorbing structure of claim 1 further comprising:
    a third layer comprising a third continuous polymer phase and a second water insoluble, dispersed, polyether resin phase in the third continuous polymer phase, bonded to the first layer opposite the second layer.

3. The multilayer nonporous oxygen absorbing structure of claim 2 wherein the third continuous polymer phase is selected from the group of: ethylene methyl acrylate (EMA); ethylene-vinyl acetate (EVA); ethylene ethyl acrylate (EEA); polyethylene; polypropylene; and, maleic anhydride grafted polyolefin.

4. The multilayer nonporous oxygen absorbing structure of claim 2 wherein the second water insoluble, dispersed, polyether resin phase is selected from the group of: polyether-block-polyamide; polyether-block-polyester; thermoplastic urethane containing polyether.

5. The multilayer nonporous oxygen absorbing structure of claim 2 wherein at least one of: the first continuous polymer phase; the first water insoluble, dispersed, polyether resin phase; the second continuous polymer phase; the third continuous polymer phase; and, the second water insoluble, dispersed, polyether resin phase, is melt processable.

6. The multilayer nonporous oxygen absorbing structure of claim 1 wherein the second layer is bonded to the first layer by a chemical bond.

7. The multilayer nonporous oxygen absorbing structure of claim 1 wherein the second layer is bonded to the first layer by melt bonding of the second layer with the first layer.

8. The multilayer nonporous oxygen absorbing structure of claim 1 wherein the second layer is bonded to the first layer by a mechanical bond.

9. The multilayer nonporous oxygen absorbing structure of claim 1 wherein the first continuous polymer phase is selected from the group of: ethylene methyl acrylate (EMA); ethylene-vinyl acetate (EVA); ethylene ethyl acrylate (EEA); polyethylene; polypropylene; polyamides; and, maleic anhydride grafted polyolefin.

10. The multilayer nonporous oxygen absorbing structure of claim 1 wherein the first water insoluble, dispersed, polyether resin phase is selected from the group of: polyether-block-polyamide; polyether-block-polyester; thermoplastic urethane containing polyether.

11. The multilayer nonporous oxygen absorbing structure of claim 1 wherein the second continuous polymer phase is selected from the group of: ethylene methyl acrylate (EMA); ethylene-vinyl acetate (EVA); ethylene ethyl acrylate (EEA); polyethylene; polypropylene; polyamides; and, maleic anhydride grafted polyolefin.

12. The multilayer nonporous oxygen absorbing structure of claim 1 wherein the water activated oxygen absorber is a transition metal in combination with a metal halide, a transition metal in combination with an electrolyte, or combinations thereof.

13. The multilayer nonporous oxygen absorbing structure of claim 1 wherein at least one of: the first continuous polymer phase; the first water insoluble, dispersed, polyether resin phase; and, the second continuous polymer phase, is melt processable.

14. The multilayer nonporous oxygen absorbing structure of claim 1 wherein the first layer further comprises a plasticizer selected from the group of: dibutyl sebacate; triacetin; triethyl citrate; and, combinations thereof.

15. The multilayer nonporous oxygen absorbing structure of claim 1 wherein the combination of the first layer and the second layer form a polymer film or a polymer sheet.

16. The multilayer nonporous oxygen absorbing structure of claim 1, wherein, the first continuous polymer phase comprises a resin including one or more of a compatibilizer, a plasticizer, an oxygen absorber dispersant, and silica gel.

17. The multilayer nonporous oxygen absorbing structure of claim 1, wherein the first layer comprises 12.6-42.3 wt % of first water insoluble, dispersed, polyether resin phase, 14.74-15.0 wt % of water activated oxygen absorber, 0.66-1.0 wt % of dispersant, and 42.3-71.4 wt % of first continuous polymer phase.

* * * * *